(12) United States Patent
Naraki et al.

(10) Patent No.: US 6,303,699 B1
(45) Date of Patent: Oct. 16, 2001

(54) VULCANIZABLE FLUORORUBBER PRODUCED FROM TETRAFLUOROETHYLENE/ PERFLUOROALKYL VINYL ETHER COPOLYMER

(75) Inventors: Akihiro Naraki; Takashi Sato, both of Kitaibaraki (JP)

(73) Assignee: Nippon Mektron, Ltd., Tokyo (JP)

( * ) Notice: Subject to any disclaimer, the term of this patent is extended or adjusted under 35 U.S.C. 154(b) by 0 days.

(21) Appl. No.: 09/252,439

(22) Filed: Feb. 18, 1999

(30) Foreign Application Priority Data

Aug. 7, 1998 (JP) .................................................. 10-224564

(51) Int. Cl.$^7$ ....................................................... C08F 8/18
(52) U.S. Cl. ...................... 525/326.3; 524/436; 524/544; 525/359.5; 525/387
(58) Field of Search .............................. 525/326.3, 359.5, 525/387; 524/544, 436

(56) References Cited

U.S. PATENT DOCUMENTS 5,654,373 * 8/1997 Kruger ............................. 525/326.3

FOREIGN PATENT DOCUMENTS

| 63308008 | 12/1988 | (JP) . |
| 10088076 | 4/1998 | (JP) . |
| 10139970 | 5/1998 | (JP) . |

* cited by examiner

*Primary Examiner*—Bernard Lipman
(74) *Attorney, Agent, or Firm*—Webb Ziesenheim Logsdon Orkin & Hanson, P.C.

(57) ABSTRACT

Disclosed is a vulcanizable fluororubber composition comprising (a) a tetrafluoroethylene/perfluoroalkyl vinyl ether copolymer, (b) an organic peroxide, (c) a co-crosslinking agent and (d) hydrotalcite. The copolymer (a) preferably contains an iodine atom or a bromine atom. The vulcanizable fluororubber composition preferably further comprises carbon black or titanium oxide. When the vulcanizable fluororubber composition is vulcanized, the resulting vulcanizate has excellent compression set and is relatively non-toxic.

4 Claims, No Drawings

VULCANIZABLE FLUORORUBBER PRODUCED FROM TETRAFLUOROETHYLENE/ PERFLUOROALKYL VINYL ETHER COPOLYMER

FIELD OF THE INVENTION

The present invention relates to vulcanizable fluororubber compositions, and more particularly to vulcanizable fluororubber compositions which show excellent compression set and are so non-toxic that no environmental pollution is brought about even when they are discarded.

BACKGROUND OF THE INVENTION

Fluororubbers have exceptional heat resistance and chemical resistance as compared with other rubbers, and therefore they are used as materials of O-rings, gaskets, packing and the like in various industrial fields, including the automobile industry.

Examples of vulcanization processes of fluororubbers include organic peroxide vulcanization, polyhydroxy vulcanization (polyol vulcanization) and polyamine vulcanization. In recent years, the fluororubbers are almost always used after they have been subjected to organic peroxide vulcanization. This provided an improvement in crosslinking efficiency and improvement in chemical resistance by the formation of a chemically stable C—C bond at the crosslink site. However, the fluororubbers having been subjected to organic peroxide vulcanization are not always satisfactory in the compression set when compared with fluororubbers having been subjected to polyhydroxy vulcanization.

Fluororubbers are generally compounded with acid acceptors to neutralize acid substances produced in the vulcanization process and to prevent corrosion of the counterparts caused by the fluororubber products. Examples of the acid acceptors include lead monoxide (PbO, litharge), zinc white (ZnO), calcium hydroxide and magnesium oxide. Fluororubbers compounded with lead monoxide (PbO, litharge) have an expectation of being improved in compression set, heat aging properties, steam resistance and chemical resistance, but disposal (for land reclamation) of such rubbers has recently become difficult in view of the environmental problems.

When zinc white (ZnO), calcium hydroxide and magnesium oxide are used as the acid acceptors in place of lead monoxide, the resulting vulcanized fluororubbers are all inferior to the vulcanized fluororubbers obtained by the use of lead monoxide in compression set, heat aging properties and steam resistance.

The present inventors have earnestly studied the problems mentioned above, and as a result, they have found that when a fluororubber is compounded with hydrotalcite, the resulting fluororubber is remarkably improved in compression set and other properties even if the fluororubber is subjected to organic peroxide vulcanization.

The present inventors have further found that especially when the fluororubber is a tetrafluoroethylene/ perfluoromethyl vinyl ether copolymer, a vulcanized product is produced which is a high value added material, having excellent compression set, high chemical resistance, relatively low toxicity and maintenance-free properties. Based on this finding, the present invention has been accomplished.

In Japanese Patent Publication No. 57125/1989, the present applicant proposed a process for preparing a peroxide-vulcanizable fluorine-containing elastomer, comprising homopolymerizing or copolymerizing a fluorine-containing olefin of 2 to 8 carbon atoms in the presence of a compound containing iodine and bromine represented by the formula $RBr_nI_m$ (R is a fluorohydrocarbon group, a chlorofluorohydrocarbon group, a chlorohydrocarbon group or a hydrocarbon group, and n and m are each 1 or 2). This publication describes that not only the organic peroxides and the polyfunctional unsaturated compounds serving as co-crosslinking agents but also oxides or hydroxides of divalent metals (e.g., oxides or hydroxides of calcium, magnesium, lead and zinc) serving as crosslinking assistants are employable in the peroxide vulcanization of the fluorine-containing elastomer, and also describes that these crosslinking assistants serve also as the acid acceptors.

Japanese Patent Laid-Open Publication No. 88076/1998, describes that, for the direct vulcanization adhesion between a layer made of either a fluororubber or a fluororesin and a layer made of an epichlorohydrin rubber, a composition comprising (A) an epichlorohydrin rubber, (B) a thiourea compound, (C) sulfur, (D) an aromatic disulfide compound and (E) 1,8-diazabicyclo[5.4.0]undecene-7 or its weak acid salt in a prescribed quantity ratio is used as a material for forming the epichlorohydrin rubber layer.

In the above publication, it is also described that the composition can be further blended with (F) a hydrotalcite compound, specifically, DHT-4A available from Kyowa Kagaku K.K., and that by virtue of blending the composition with the compound (F), adhesion between the two layers can be improved, the compression set, storage stability and sour gasoline resistance of the epichlorohydrin rubber layer can be improved, and the problem of toxicity can be solved because no lead compound is used as the acid acceptor.

Japanese Patent Laid-Open Publication No. 139970/1998, describes a fluororubber composition comprising a vinylidene fluoride/perfluoro (methyl vinyl ether)/ tetrafluoroethylene terpolymer having a fluorine content of not less than 66%, a liquid fluororubber, carbon black having an iodine adsorption of about 40 to 100 mg/g and a hydrotalcite/calcium hydroxide mixture having a mixing ratio by weight of about 40/60 to 95/5. In this publication, it is also described that the composition is favorable as a vulcanization molding material of seal rings for FFV (Flexible Fuel Vehicle) fuel oil and can provide seal rings which are excellent in fuel oil swell resistance, low temperature properties, amine cracking resistance and metal corrosion resistance. It is further described that, in the preparation of the fluororubber composition, a vulcanizing agent such as an organic peroxide, a co-crosslinking agent which is a polyfunctional unsaturated compound, a vulcanization accelerator, a processing aid, etc. are optionally added to the above components and kneaded, and the kneadate is subjected to vulcanization molding.

None of the above publications, however, teaches or suggests that vulcanization of a vulcanizable fluororubber composition comprising tetrafluoroethylene/perfluoroalkyl vinyl ether copolymer, an organic peroxide, a co-crosslinking agent and hydrotalcite makes it possible to obtain a vulcanized product having excellent compression set and which causes no environmental pollution even when discarded.

The present invention solves the problems found in the prior art as described above, and provides a tetrafluoroethylene/perfluoroalkyl vinyl ether copolymer composition having excellent compression set and air heat aging properties and causing no environmental pollution even when discarded.

SUMMARY OF THE INVENTION

The vulcanizable fluororubber composition according to the present invention comprises:

(a) a tetrafluoroethylene/perfluoroalkyl vinyl ether copolymer, (b) an organic peroxide, (c) a co-crosslinking agent, and (d) hydrotalcite.

In the present invention, the copolymer (a) preferably contains an iodine atom or a bromine atom.

The vulcanizable fluororubber composition of the invention preferably further comprises carbon black or titanium oxide.

According to the present invention, a tetrafluoroethylene/ perfluoroalkl vinyl ether copolymer composition having excellent compression set is provided and which causes no environmental pollution even when discarded. When the vulcanizable fluororubber composition is vulcanized, a vulcanized product having excellent compression set, mechanical properties, air heat aging properties and chemical resistance is obtained.

DETAILED DESCRIPTION OF THE INVENTION

The vulcanizable fluororubber composition according to the invention is described in detail hereinafter.

Vulcanizable Fluororubber Composition

The vulcanizable fluororubber composition of the invention comprises:

(a) a tetrafluoroethylene/perfluoroalkyl vinyl ether copolymer (sometimes referred to simply as "copolymer (a)" hereinafter), (b) an organic peroxide, (c) a co-crosslinking agent, and (d) hydrotalcite.

The components of the vulcanizable fluororubber composition are described below.

Copolymer (a)

The tetrafluoroethylene/perfluoroalkyl vinyl ether copolymer (a) usually contains tetrafluoroethylene (TFE) component units in amounts of 55 to 70% by mol and perfluoromethyl vinyl ether (PMVE) component units in the residual amounts, i.e., 30 to 45% by mol, and preferably contains tetrafluoroethylene (TFE) component units in amounts of 60 to 65% by mol and perfluoromethyl vinyl ether (PMVE) component units in the residual amounts, i.e., 35 to 40% by mol. The total amount of all component units in the tetrafluoroethylene/perfluoromethyl vinyl ether copolymer is 100% by mol.

In the copolymer (a), perfluoro(alkyl vinyl ether) component units (PAVE component units) other than the perfluoro (methyl vinyl ether) component units may be contained in small amounts, e.g., not more than 5% by mol. Examples of the perfluoro(alkyl vinyl ether) component units include those containing an alkyl group of 2 to 6 carbon atoms, such as perfluoro(ethyl vinyl ether) component units and perfluoro(propyl vinyl ether) component units.

In the copolymer (a), an iodine atom or a bromine atom may be present, and the amount of the iodine atom or the bromine atom contained in the copolymer (a) is usually about 0.001 to 5% by weight, preferably about 0.01 to 3% by weight. If the iodine atom or the bromine atom is present in the copolymer (a), the iodine atom or the bromine atom is easily released by the radical from the organic peroxide and becomes a highly active radical in the crosslinking process. The highly active radical is added to a polyfunctional unsaturated compound, which is compounded substantially as a vulcanizing agent, to efficiently perform crosslinking, and besides a C—C bond that is chemically more stable than a C=N bond formed in the polyamine vulcanization or a C—O bond formed in the polyol vulcanization is formed at the crosslink site, so that the resulting composition tends to be improved in elastomeric properties, heat resistance and chemical resistance.

Preparation of Copolymer (a)

The copolymer (a) can be prepared in accordance with the process previously proposed by the present applicant in Japanese Patent Publication No. 57125/1989.

That is, tetrafluoroethylene as a fluorine-containing olefin and perfluoromethyl vinyl ether are copolymerized preferably in the presence of the below-described compound containing iodine and bromine.

The compound containing iodine and bromine is represented by the formula $RBr_nI_m$ (R is a fluorohydrocarbon group, a chlorofluorohydrocarbon group, a chlorohydrocarbon group or a hydrocarbon group, and n and m are each 1 or 2) as described in the above-mentioned Japanese Patent Publication No. 57125/1989.

R in the above formula is preferably a fluorohydrocarbon group, a chlorofluorohydrocarbon group, a chlorohydrocarbon group or a hydrocarbon group, each of which has 1 to 10 carbon atoms. To the groups, functional groups such as —O—, —S—, =NR, —COOH, —$SO_2$, —$SO_3H$ and —$PO_3H$ may be attached.

The compound containing iodine and bromine may be any of a saturated compound and an unsaturated compound, and may be a chain compound or an aromatic compound. The compound containing iodine and bromine preferably is one wherein n and m are each 1.

Examples of the chain compounds containing iodine and bromine include 1-bromo-2-iodoperfluoroethane, 1-bromo-3-iodoperfluoropropane, 1,3-dibromo-2-iodoperfluoropropane, 1-bromo-2-iodo-2-chloroethane, 1-iodo-2-bromo-1-chloroethane, 3-bromo-4-iodoperfluorobutene-1, 3-iodo-4-bromoperfluorobutene-1 and 1-bromo-2-iodoperfluoroethyl perfluoromethyl ether, as shown in the above publication.

Examples of the aromatic compounds containing iodine and bromine include substituted benzene, such as 1-iodo-2-bromobenzene and 1-iodo-3-bromobenzene, and substituted perfluorobenzene, such as 1-iodo-2-bromoperfluorobenzene.

In the polymerization reaction of the monomers, i.e., tetrafluoroethylene and perfluoromethyl vinyl ether, the compound containing iodine and bromine easily undergoes radical cleavage of iodine and bromine by the action of a radical production source of the organic peroxide. Because of the high reactivity of the radicals produced in the compound containing iodine and bromine, the monomers undergo a propagation reaction. Then, iodine and bromine are abstracted from the compound containing iodine and bromine to terminate the reaction, whereby the copolymer (a) in which iodine and bromine are bonded at the molecular terminals is obtained.

That is, the compound containing iodine and bromine is generally linked at the molecular terminals of the resulting copolymer and contributes to obtaining a vulcanizable fluororubber composition capable of being efficiently crosslinked.

When the component units derived from the compound containing iodine and bromine are contained in the copolymer (a) in amounts of about 0.001 to 5% by weight, preferably about 0.01 to 3% by weight, in terms of an iodine atom or a bromine atom, the crosslink density of the copolymer is increased by vulcanization, and a vulcanized product having excellent elastomeric properties (elongation) and heat resistance tends to be obtained.

The copolymerization reaction of the tetrafluoroethylene and the perfluoromethyl vinyl ether preferably in the presence of the compound containing iodine and bromine can be carried out by any of solution polymerization, suspension polymerization and emulsion polymerization processes, as described in detail in the aforesaid publication.

Organic Peroxide (b)

The organic peroxide (b) functions as a crosslinking agent, and hitherto known organic peroxides can be widely employed. Examples of the organic peroxides include 2,5-dimethyl-2,5-bis(tert-butylperoxy)hexane, 2,5-dimethyl-2,5-bis(tert-butylperoxy)hexane-3, benzoyl peroxide, bis(2,4-dichlorobenzoyl)peroxide, dicumyl peroxide, di-tert-butyl peroxide, tert-butylcumyl peroxide, tert-butylperoxybenzene, 1,1-bis(tert-butylperoxy)-3,5,5-trimethylcyclohexane, 2,5-dimethylhexane-2,5-dihydroxyperoxide, α,α'-bis (tert-butylperoxy)-p-diisopropylbenzene, 2,5-dimethyl-2,5-di(benzoylperoxy)hexane, di-t-amyl peroxide and tert-butylperoxyisopropyl carbonate. Of these, preferable are 2,5-dimethyl-2,5-bis(tert-butylperoxy)hexane (trade name: Perhexa 2.5B40, available from Nippon Oils & Fats Co., Ltd.), 2,5-dimethyl-2,5-di(benzoylperoxy)hexane (trade name: Perhexa 25Z, available from Nippon Oils & Fats Co., Ltd.) and di-t-amyl peroxide (available from Atochem Yoshitomi K.K.). The organic peroxides can be used singly or in combination of two or more kinds.

Co-crosslinking Agent (c)

In the peroxide vulcanization process using the above-mentioned organic peroxide (b), a polyfunctional unsaturated compound is generally used as a co-crosslinking agent in combination with the organic peroxide (b). When the co-crosslinking agent is used in combination with the organic peroxide (b), vulcanization properties of the composition can be improved, and a fluororubber vulcanized product having high mechanical strength and excellent compression set can be obtained.

Examples of the polyfunctional unsaturated compounds include tri(meth)allyl isocyanurate, tri(meth)allyl cyanurate, triallyl trimellitate, N,N'-m-phenylenebismaleimide, diallyl phthalate, tris(diallylamine)-s-triazine, triallyl phosphite, 1,2-polybutadiene, ethylene glycol diacrylate and diethylene glycol diacrylate. These co-crosslinking agents can be used singly or in combination of two or more kinds.

Hydrotalcite (d)

The hydrotalcite (d) is a hydrated basic carbonate mineral of magnesium and aluminum, which is highly safe because of non-toxicity, has excellent compatibility with the copolymer (a), and functions as an acid acceptor, a stabilizer and the like. The hydrotalcite employable in the invention may be synthetic or a natural one. The natural hydrotalcite is represented by the composition formula $Mg_6Al_2(OH)_{16}CO_3 \cdot 4H_2O$. The synthetic hydrotalcite is, for example, hydrotalcite represented by the composition formula $Mg_{4.5}Al_2(OH)_{13}CO_3 \cdot 3.5H_2O$ (trade name: DHT-4A, available from Kyowa Kagaku Kogyo K.K.). The synthetic hydrotalcite DHT-4A is preferably employed in the invention. The $CO_3$ moiety of the hydrotalcite is replaced with a halogen ion or the like present in the vulcanized composition as indicated by, for example, the following formulas, and continuously captures the halogen present in the vulcanized composition or the vulcanized molded product until the temperature becomes a high temperature of about 450° C. to make it inert. Therefore, lowering of water resistance of the vulcanized molded product or corrosion of a metallic material as a counterpart to the vulcanized molded product is hardly brought about.

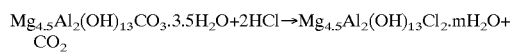

$$Mg_{4.5}Al_2(OH)_{13}CO_3 \cdot 3.5H_2O + 2HCl \rightarrow Mg_{4.5}Al_2(OH)_{13}Cl_2 \cdot mH_2O + CO_2$$

In the vulcanizable fluororubber composition of the invention, it is desired that:

the organic peroxide (b) such as 2,5-dimethyl-2,5-bis(tert-butylperoxy)hexane is contained in an amount of usually 0.1 to 10 parts by weight, preferably 0.5 to 5 parts by weight, the co-crosslinking agent (c) such as tri(meth)allyl isocyanurate is contained in an amount of usually 0.1 to 10 parts by weight, preferably 1.0 to 6 parts by weight, and the hydrotalcite (d) is contained in an amount of usually 1.5 to 20 parts by weight, preferably 2 to 10 parts by weight, each amount being based on 100 parts by weight of the tetrafluoroethylene/perfluoroalkyl vinyl ether copolymer (a).

When the amount of the hydrotalcite is less than 1.5 parts by weight based on 100 parts by weight of the copolymer (a), the compression set of the composition is not improved sufficiently. When the amount thereof exceeds 20 parts by weight, the vulcanized molded product not only has high hardness but in addition the composition becomes too hard and is unsuitable for large-sized molding requiring flow properties. Moreover, scorching tends to occur because the vulcanization proceeds rapidly.

Other Compounding Ingredients

Various compounding ingredients in addition to the above-mentioned ones, such as crosslinking assistants, fillers, reinforcing agents, (co)polymers crosslinkable with organic peroxides, plasticizers, lubricants, processing aids, pigments and perfluoropolyethers, may be added to the vulcanizable fluororubber composition of the invention.

Examples of the crosslinking assistants include oxides or hydroxides of divalent metals, such as oxides or hydroxides of calcium, magnesium iron and zinc.

Examples of the fillers include carbon black, titanium oxide, silica (white carbon), talc, diatomaceous earth, barium sulfate and clay. Of these, carbon black and titanium oxide are preferably employed.

The crosslinking assistant can be used in an amount of, for example, not more than 15 parts by weight based on 100 parts by weight of the copolymer (a).

Examples of the (co)polymers crosslinkable with the organic peroxide include silicone oil, silicone rubber, fluorosilicone rubber, fluorophosphazene rubber, ethylene/vinyl acetate copolymer, ethylene/acrylic ester copolymer, ethylene/propylene(/diene) copolymer rubber, acrylonitrile/butadiene copolymer rubber and acrylic ester rubber.

Examples of the pigments include red oxide and Cyanine Green.

In the vulcanizable fluororubber composition, a perfluoropolyether may be further contained in an amount of 0 to 30 parts by weight, preferably 10 to 20 parts by weight, based on 100 parts by weight of the copolymer (a) contained in the composition. Examples of the perfluoropolyethers include perfluoro(polyethylene oxide) and perfluoro (polypropylene oxide).

Preparation of Vulcanizable Fluororubber Composition and Crosslinking (Vulcanization) of the Composition The vulcanizable fluororubber composition of the invention can be prepared by blending the copolymer (a), the organic peroxide (b), the co-crosslinking agent (c) and the hydrotalcite (d) at the same time or by appropriate portions in an arbitrary order and kneading them, in accordance with a conventional method.

A vulcanized product (crosslinked product) of the vulcanizable fluororubber composition can be obtained by mixing the above components by the use of a mixing apparatus such as roller, kneader or Banbury mixer and heating the mixture. Heating of the mixture is achieved by conducting "primary vulcanization" wherein the mixture is maintained at about 100 to 250° C. for about 1 to 120 minutes and then conducting "secondary vulcanization" wherein the mixture is maintained at about 150 to 300° C. for about 0 to 30 hours.

When the vulcanizable fluororubber composition according to the invention is vulcanized, a vulcanized product having excellent compression set, mechanical properties, air heat aging properties and chemical resistance is obtained.

EXAMPLE

The vulcanizable fluororubber composition of the present invention is further described with reference to the following examples, but it should be understood that the invention is in no way limited to those examples.

The test conditions of the tests shown in the tables are as follows.

Vulcanization Properties

A test piece was maintained at 180° C. for 6 minutes by means of MDR2000 (manufactured by Monsanto Co.) to measure vulcanization properties.

Physical Properties

Physical properties of a vulcanized product were measured in accordance with the standard method of JIS K-6301.

Compression Set

A P-24 O-ring was compressed by 25% at 200° C. for 70 hours to measure a compression set. Further, three punched test pieces superposed upon each other (thickness: 6 mm) were compressed by 25% at 200° C. for 70 hours in accordance with the method of DIN53517 to measure a compression set.

Air Heat Aging Test

A test piece was maintained at 250° C. for 70 hours in a gear oven to carry out an air heat aging test.

Steam Test

Distilled water of 100 cc was introduced into a 500-cc closed metal container and maintained therein at 200° C. for 70 hours to carry out a steam test.

Solvent Resistance Test

A test piece was maintained at 23° C. for 168 hours in a glass test tube equipped with a condenser to measure solvent resistance.

Example 1

The following components were kneaded by 8-inch mixing rolls. The kneadate was subjected to press vulcanization at 180° C. for 10 minutes and then to oven vulcanization at 200° C. for 6 hours.

| Components | |
| --- | --- |
| Polymer A | 100 parts by weight |
| MT Carbon black | 6 parts by weight |
| Hydrotalcite | 3 parts by weight |
| TAIC M-60 | 3.5 parts by weight |
| Perhexa 2.5B-40 | 2 parts by weight |

The resulting vulcanized product was tested on the test items shown in Tables 1 and 2.

The components shown in the tables are as follows.

(1) Polymer A tetrafluoroethylene (TFE)/perfluoromethyl vinyl ether (VE)=60/40 (% by mol), Mooney viscosity $ML_{1+10}$ (121° C.): 12 P, contents of iodine and bromine: 0.4% by weight Preparation process To a 3-liter autoclave, 1,100 ml of deionized water, 1.8 g of 1-bromo-2-iodoperfluoroethane, 4.2 g of ammonium perfluorooctanoate, 3.3 g of disodium hydrogenphosphate.12 hydrate, 1.1 g of ammonium persulfate and 0.07 g of acid sodium sulfite were introduced. Then, 559 g of perfluoromethyl vinyl ether and 198 g of tetrafluoroethylene were added.

A copolymerization reaction was conducted at 50° C. for 24 hours. Then, the unreacted gas was removed from the autoclave to terminate the reaction. To the resulting aqueous emulsion was added a 5% potassium alum aqueous solution to coagulate a polymer produced. The polymer was washed with water and dried to obtain 410 g of a rubber-like polymer (polymer A).

(2) Polymer B tetrafluoroethylene (TFE)/perfluoromethyl vinyl ether (VE)/vinylidene fluoride (VdF)=10/20/70 (% by mol), contents of iodine and bromine: 0.5% by weight Preparation process To a 3-liter pressure-resistant container equipped with a stirrer, 1,100 g of deoxygenated, demineralized water, 4.7 g of ammonium perfluorooctanoate as a surface active agent, 0.3 g of ammonium persulfate as a polymerization initiator, 1.63 g of $ICF_2CF_2Br$ as a crosslink site-introducing compound and 3 g of $Na_2HPO_4.12H_2O$ as a buffering agent were introduced, and the whole contents were cooled to −30° C.

Then, the internal space of the container was thoroughly purged with pure nitrogen, and 184 g of perfluoromethyl vinyl ether (VE), 55 g of tetrafluoroethylene (TFE) and 249 g of vinylidene fluoride (VdF) were injected into the container in this order. Thereafter, the temperature of the system was raised to 50° C., and upon ascertainment of ice melting, stirring of the contents was begun. As a result, the reaction proceeded, and after 19 hours, the pressure fell to 2 kg/cm² from 35 kg/cm². After no further fall of the pressure was confirmed, the unreacted mixed gas was removed to terminate the polymerization reaction.

To the resulting aqueous emulsion was added a 5% potassium alum aqueous solution to coagulate the polymer produced. The polymer was washed with water and dried to obtain 439 g (yield: 90%) of a rubber-like random copolymer (polymer B).

(3) Titanium Oxide
  rutile type, CR93, available from Ishihara Sangyo K.K.
(4) Carplex 1120
  white carbon (wet process), available from Shionogi & Co., Ltd.
(5) Hydrotalcite
  trade name: DHT-4A, composition formula: $Mg_{4.5}Al_2(OH)_{13}CO_3 \cdot 3.5H_2O$, available from Kyowa Kagaku Kogyo K.K.
(6) Triallyl Isocyanurate
  trade name: TAIC M-60, available from Nippon Kasei K.K.
(7) Perhexa 2.5B40 (Trade Name)
  2,5-dimethyl-2,5-di-tert-butylperoxyhexane, available from Nippon Oils & Fats Co.

TABLE 1

| | | Example | Comparative Example | | |
|---|---|---|---|---|---|
| | | 1 | 1 | 2 | 3 |
| Compound (parts by weight) | (1) Polymer A | 100 | 100 | 100 | 100 |
| | (2) Polymer B | | | | |
| | (3) Titanium oxide | | | | |
| | (4) Carplex 1120 | | | | |
| | MT carbon black | 6 | 6 | 6 | 6 |
| | Litharge (PbO) | | 3 | | |
| | Zinc white (ZnO) | | | | 3 |
| | (5) Hydrotalcite | 3 | | | |
| | (6) Triallyl isocyanurate (TAIC M-60) | 3.5 | 3.5 | 3.5 | 3.5 |
| | (7) Perhexa 2.5B-40 | 2 | 2 | 2 | 2 |
| Vulcanization properties (vulcanization torque measured by MDR-2000 (Monsanto Co.)) | TC90 (min) | 2.38 | 2.46 | 2.5 | 2.38 |
| | Minimum torque ML (dN · m) | 0.1 | 0.2 | 0.1 | 0.2 |
| | Maximum torque MH (dN · m) | 17.9 | 16.5 | 16 | 16.7 |
| | Press vulcanization (° C./min) | 180/10 | 180/10 | 180/10 | 180/10 |
| | Oven vulcanization (° C./min) | 200/6 | 200/6 | 200/6 | 200/6 |
| Ordinary state properties | Tensile strength (MPa) | 18.9 | 18.6 | 18.1 | 19.4 |
| | Elongation at break (%) | 210 | 210 | 220 | 210 |
| | Hardness (JIS-A) | 75 | 74 | 73 | 74 |
| | Compression set (%) ASTM Method-B/P-24 O-ring, 200° C./70 hr | 17 | 21 | 29 | 28 |
| | Compression set (%) DIN53517, 200° C./70 hr | 24 | 27 | 36 | 34 |
| Air aging properties (250° C./70 hr) | Rate of change in tensile strength (%) | −2 | −12 | −10 | −10 |
| | Rate of change in elongation at break (%) | 19 | 57 | 65 | 62 |
| | Change in hardness | −1 | −1 | −1 | −1 |
| Steam test (200° C./70 hr) | Rate of change in tensile strength (%) | −30 | −37 | −35 | −33 |
| | Rate of change in elongation at break (%) | 5 | −5 | −10 | −5 |
| | Change in hardness | −4 | −3 | −5 | −5 |
| | Rate of change in volume (%) | 14.3 | 13.8 | 16.8 | 17.2 |
| Solvent test (Methanol, 23° C./168 hr) | Rate of change in tensile strength (%) | −3 | −2 | −2 | −5 |
| | Rate of change in elongation at break (%) | −4 | −1 | −3 | −3 |
| | Change in hardness | 0 | −1 | −1 | 0 |
| | Rate of change in volume (%) | 0.7 | 0.6 | 0.6 | 0.7 |

TABLE 2

| | | Example | Comparative Example | | |
|---|---|---|---|---|---|
| | | 2 | 4 | 5 | 6 |
| Compound (parts by weight) | (1) Polymer A | 100 | 100 | | |
| | (2) Polymer B | | | 100 | 100 |
| | (3) Titanium oxide | 10 | 10 | | |
| | (4) Carplex 1120 | | 2 | | |
| | MT carbon black | | | 30 | 30 |
| | Litharge (PbO) | | | 3 | |
| | Zinc white (ZnO) | | | | |
| | (5) Hydrotalcite | 2 | | | 3 |
| | (6) Triallyl isocyanurate (TAIC M-60) | 3.5 | 3.5 | 6.5 | 6.5 |
| | (7) Perhexa 2.5B-40 | 2 | 2 | 1.5 | 1.5 |

TABLE 2-continued

|  |  | Example | Comparative Example | | |
|---|---|---|---|---|---|
|  |  | 2 | 4 | 5 | 6 |
| Vulcanization properties (vulcanization torque measured by MDR-2000 Monsanto Co.)) | TC90 (min) | 2.63 | 2.68 | 2.38 | 2.32 |
|  | Minimum torque ML (dN · m) | 0.1 | 0.1 | 1.4 | 1.5 |
|  | Maximum torque MH (dN · m) | 15.3 | 14.9 | 30.5 | 31.2 |
|  | Press vulcanization (° C./min) | 180/10 | 180/10 | 180/10 | 180/10 |
|  | Oven vulcanization (° C./min) | 200/6 | 200/6 | 200/22 | 200/22 |
| Ordinary state properties | Tensile strength (Mpa) | 12.8 | 12.1 | 22.3 | 23 |
|  | Elongation at break (%) | 230 | 220 | 250 | 260 |
|  | Hardness (JIS-A) | 66 | 65 | 70 | 71 |
|  | Compression set (%) ASTM Method-B/P-24 O-ring, 200° C./70 hr | — | — | 24 | 20 |
|  | Compression set (%) DIN53517, 200° C./70 hr | 15 | 17 | — | — |
| Air aging properties (250° C./70 hr) | Rate of change in tensile strength (%) | −5 | −7 | −15 | −13 |
|  | Rate of change in elongation at break (%) | 30 | 41 | −18 | −14 |
|  | Change in hardness | −2 | −2 | −4 | −4 |
| Steam test (200° C./70 hr) | Rate of change in tensile strength (%) |  |  |  |  |
|  | Rate of change in elongation at break (%) |  |  |  |  |
|  | Change in hardness |  |  |  |  |
|  | Rate of change in volume (%) |  |  |  |  |
| Solvent test (Methanol, 23° C./168 hr) | Rate of change in tensile strength (%) | −3 | −1 | −44 | −42 |
|  | Rate of change in elongation at break (%) | −3 | 0 | −66 | −67 |
|  | Change in hardness | −1 | −1 | −22 | −22 |
|  | Rate of change in volume (%) | 0.8 | 0.8 | 82.3 | 79.4 |

What is claimed is:

1. A vulcanizable fluororubber composition comprising:

(a) a copolymer consisting essentially of recurring units derived from tetrafluoroethylene and perfluoroalkyl vinyl ether, (b) an organic peroxide, (c) a co-crosslinking agent, and (d) hydrotalcite.

2. The vulcanizable fluororubber composition as claimed in claim 1, wherein the copolymer (a) contains an iodine atom or a bromine atom.

3. The vulcanizable fluororubber composition as claimed in claim 1, further comprising carbon black or titanium oxide.

4. The vulcanizable fluororubber composition as claimed in claim 2, further comprising carbon black or titanium oxide.

* * * * *

UNITED STATES PATENT AND TRADEMARK OFFICE
CERTIFICATE OF CORRECTION

| | |
|---|---|
| PATENT NO. | : 6,303,699 B1 |
| DATED | : October 16, 2001 |
| INVENTOR(S) | : Akihiro Naraki and Takashi Sato |

It is certified that error appears in the above-identified patent and that said Letters Patent is hereby corrected as shown below:

<u>Column 10,</u>
Table 1, refer to heading "Comparative Example 3", under row entitled "Steam test (200° C./70 hr)": "-5" should read -- 5 -- (delete negative).

Signed and Sealed this

Ninth Day of April, 2002

*Attest:*

JAMES E. ROGAN
*Attesting Officer*     *Director of the United States Patent and Trademark Office*